(12) United States Patent
Oberle et al.

(10) Patent No.: US 10,675,664 B2
(45) Date of Patent: Jun. 9, 2020

(54) PFAS REMEDIATION METHOD AND SYSTEM

(71) Applicant: TRS Group, Inc., Longview, WA (US)

(72) Inventors: Daniel Oberle, Sylvania, OH (US); Emily Crownover, Weldon Spring, MO (US)

(73) Assignee: TRS Group, Inc., Longview, WA (US)

( * ) Notice: Subject to any disclaimer, the term of this patent is extended or adjusted under 35 U.S.C. 154(b) by 0 days.

(21) Appl. No.: 16/452,141

(22) Filed: Jun. 25, 2019

(65) Prior Publication Data

US 2019/0314876 A1 Oct. 17, 2019

Related U.S. Application Data

(63) Continuation-in-part of application No. PCT/US2018/014472, filed on Jan. 19, 2018, and a continuation-in-part of application No. PCT/US2019/039020, filed on Jun. 25, 2019.

(60) Provisional application No. 62/689,957, filed on Jun. 26, 2018.

(51) Int. Cl.

| | | |
|---|---|---|
| *B09C 1/00* | (2006.01) | |
| *B09C 1/06* | (2006.01) | |
| *B09B 3/00* | (2006.01) | |
| *H05B 3/74* | (2006.01) | |
| *H05B 3/00* | (2006.01) | |

(52) U.S. Cl.
CPC ............ *B09C 1/062* (2013.01); *B09B 3/0083* (2013.01); *H05B 3/0004* (2013.01); *H05B 3/748* (2013.01); *B09C 2101/00* (2013.01); *H05B 2203/003* (2013.01)

(58) Field of Classification Search
CPC ............ B09C 1/005; B09C 1/06; B09C 1/062
See application file for complete search history.

(56) References Cited

U.S. PATENT DOCUMENTS

| | | |
|---|---|---|
| 2,902,270 A | 9/1959 | Salomonsson et al. |
| 3,153,342 A | 10/1964 | Pierce et al. |
| 3,678,249 A | 7/1972 | Lennox |
| 3,813,771 A | 6/1974 | Skogland |
| 3,948,319 A | 4/1976 | Pritchett |
| 4,670,634 A * | 6/1987 | Bridges .................. B09C 1/005 166/248 |

(Continued)

FOREIGN PATENT DOCUMENTS

| | | |
|---|---|---|
| WO | 2005019110 A2 | 3/2005 |
| WO | 2017131972 A1 | 8/2017 |
| WO | 2018097875 A1 | 5/2018 |

OTHER PUBLICATIONS

International Search Report and Written Opinion dated May 23, 2018 in International Patent Application PCT/US2018/014472.

(Continued)

*Primary Examiner* — Janine M Kreck (74) *Attorney, Agent, or Firm* — Joan T. Kluger; Barnes & Thornburg LLP (57) ABSTRACT

A method and system to remediate soil containing PFAS compounds and organic carbon. Total organic carbon is reduced by heating the soil at a sufficient temperature and for a sufficient duration to reduce surface effects between the PFAS compounds and the organic carbon to permit evaporation and treatment of the PFAS compounds from the soil.

22 Claims, 4 Drawing Sheets

(56) References Cited

U.S. PATENT DOCUMENTS

| | | | |
|---|---|---|---|
| 4,957,393 A * | 9/1990 | Buelt | B09C 1/065 405/128.6 |
| 4,984,594 A | 1/1991 | Vinegar et al. | |
| 5,011,329 A | 4/1991 | Nelson et al. | |
| 5,018,576 A | 5/1991 | Udell et al. | |
| 5,076,727 A | 12/1991 | Johnson et al. | |
| 5,114,497 A | 5/1992 | Johnson et al. | |
| 5,169,263 A | 12/1992 | Johnson et al. | |
| 5,190,405 A | 3/1993 | Vinegar et al. | |
| 5,193,934 A | 3/1993 | Johnson et al. | |
| 5,221,827 A | 6/1993 | Marsden, Jr. et al. | |
| 5,233,164 A | 8/1993 | Dicks et al. | |
| 5,244,310 A | 9/1993 | Johnson | |
| 5,318,116 A | 6/1994 | Vinegar et al. | |
| 5,330,291 A | 7/1994 | Heath et al. | |
| 5,347,070 A | 9/1994 | Heath et al. | |
| 5,558,463 A | 9/1996 | Geisel | |
| 5,674,424 A | 10/1997 | Iben et al. | |
| 5,769,569 A | 6/1998 | Hosseini | |
| 5,986,159 A | 11/1999 | Aines et al. | |
| 5,994,670 A | 11/1999 | Buettner | |
| 6,023,554 A | 2/2000 | Vinegar et al. | |
| 6,285,014 B1 | 9/2001 | Beck et al. | |
| 6,485,232 B1 | 11/2002 | Vinegar et al. | |
| 6,632,047 B2 | 10/2003 | Vinegar et al. | |
| 6,824,328 B1 | 11/2004 | Vinegar et al. | |
| 6,951,436 B2 | 10/2005 | Stegemeier et al. | |
| 7,004,678 B2 | 2/2006 | Stegemeier et al. | |
| 7,290,959 B2 | 11/2007 | Beyke et al. | |
| 7,534,926 B2 | 5/2009 | Stegemeier et al. | |
| 7,618,215 B2 | 11/2009 | Haemers et al. | |
| 8,348,551 B2 | 1/2013 | Baker et al. | |
| 9,364,877 B2 | 6/2016 | Brady | |
| 9,370,809 B2 | 6/2016 | Brady et al. | |
| 9,718,103 B2 | 8/2017 | Haemers | |
| 2008/0078551 A1 | 4/2008 | De Vault et al. | |
| 2010/0147826 A1 | 6/2010 | Schlipf | |
| 2011/0295504 A1 | 12/2011 | Barber et al. | |
| 2013/0202363 A1 | 8/2013 | Haemers | |
| 2013/0206748 A1 | 8/2013 | Vinegar et al. | |
| 2015/0001206 A1 | 1/2015 | Schlipf | |
| 2015/0010359 A1 | 1/2015 | Geckeler | |

OTHER PUBLICATIONS

Concawe Environmental Science for the European Refining Industry Report No. 8/16, Environmental fate and effects of poly- and perfluoroalkyl substances (PEAS), Prepared ARCADIS for the Concawe Soil and Groundwater Taskforce (STF/33), Brussels, Jun. 2016.

Article on the Effect of Temperature on Volatilization of Alkali Salts During Dry Ashing of Tetrafluoroethylene Fluorocarbon Resin.

Groundwater and PFAS: State of Knowledge and Practice, Remediation and Treatment, Section 8,. prepared by National Ground Water Association.

Technical Memorandum Regarding Bench Scale VEG REsearch & Development Study: Implementation Memorandum for Ex-Situ Thermal Desorption of Perfluoroalkyl Compounds (PFCs) in Soils, Endpoint Consulting, Inc., Mehrdad Javaherian, Phd., Pe, LEED GA, Feb. 26, 2016.

Non-Final Office Action issued in U.S. Appl. No. 15/875,543 dated Sep. 14, 2018.

International Search Report and Written Opinion issued in International Patent Application PCT/US2019/039020 dated Sep. 24, 2019.

* cited by examiner

PFAS REMEDIATION METHOD AND SYSTEM

FIELD

The present disclosure relates to environmental remediation. In particular, to removal of perfluoroalkyl and polyfluoroalkyl substances from soil.

BACKGROUND

Per perfluoroalkyl and polyfluoroalkyl substances (PFAS) are contaminants of concern. There are about 3,000 types of these compounds in the environment. They are soluble, highly resistant to biotic and abiotic degradation, and can withstand extremely high temperatures before breaking down.

PFAS compounds have been widely used in consumer products and industrial products and processes. The PFAS characteristics that make them beneficial for these applications can also prevent them from readily degrading and challenging to remediate. The unique characteristics of PFAS compounds render many remediation techniques that are effective on other contaminants ineffective to remediate PFAS compounds. Bioremediation is mostly ineffective for treating PFAS-contaminated soil. Additionally, limited success has been found by applying soil vapor extraction and other common hydrocarbon remediation techniques. Furthermore, it is generally accepted that very high temperatures, above 600 degrees Celsius for example, are necessary to effectively remediate PFAS compounds. Although most PFAS compounds boil at temperatures in the range of 76 degrees Celsius to 218 degrees Celsius, there is very poor removal even at 225 degrees Celsius applied over multiple days.

Accordingly, there is a need for an effective PFAS remediation technique in soil.

SUMMARY

The disclosed methods and systems may be used to remediate soil containing PFAS compounds and organic carbon. Illustrative embodiments include volatilizing these compounds from a soil matrix, which may contain relatively high concentrations of total organic carbon (TOC), or amounts generally found in United States soil, typically about 0.25% by weight. Illustrative embodiments also include soil remediation in which the percent of TOCs is initially less than 0.25%. TOC is reduced by heating the soil at a sufficient temperature and for a sufficient duration to reduce surface effects between the PFAS compounds and the organic carbon to permit evaporation of the PFAS compounds from the soil. In an illustrative embodiments soil is treated in-situ at a temperature in the range of above about 225 degrees Celsius and below about 440 degrees Celsius, and in a further illustrative embodiment at a temperature in the range of about 300 degrees Celsius to about 400 degrees Celsius. The invention includes various combinations of temperature levels and duration of heating to remediate PFAS compounds.

DESCRIPTION OF DRAWINGS

The detailed description refers to the accompanying Figure, which depicts an illustrative embodiment.

DETAILED DESCRIPTION OF EMBODIMENTS

The descriptions provided herein may have been simplified to illustrate aspects that are relevant for an understanding of the systems and methods described herein while eliminating, for the purpose of clarity, other aspects that may be found in typical systems and methods. Those of ordinary skill may recognize that other elements or operations may be desirable or necessary to implement the systems and methods described herein. Because such elements and operations are well known in the art, and because they do not facilitate a better understanding of the present disclosure, a discussion of such elements and operations may not be provided herein. This disclosure is deemed to inherently include all such elements, variations, and modifications to the described aspects that could be implemented by those of ordinary skill in the art.

Figure 1:
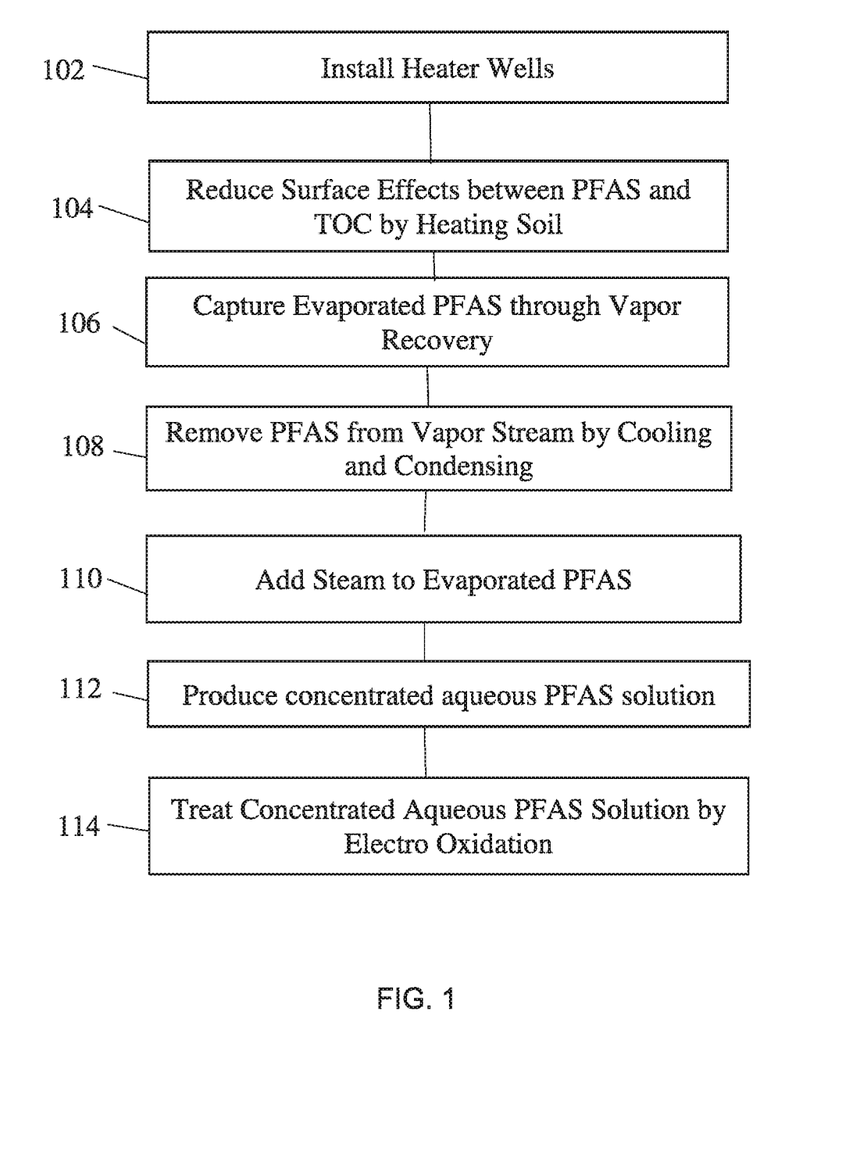
FIG. 1 is a flow chart of an illustrative PFAS remediation method.

A method of remediation of soil containing PFAS compounds is disclosed, and a system in which the method is implemented. The Figure provides a flow chart of an illustrative PFAS remediation method. The method is carried out using thermal remediation techniques. In step 102 heater wells are installed. In step 104 total organic carbon (TOC) is reduced by heating the soil at a sufficient temperature and for a sufficient duration to reduce surface effects between the PFAS compounds and the organic carbon by breaking down the organic carbon. The surface effects may be, for example, electrostatic forces and van der Walls forces. This permits evaporation of the PFAS compounds from the soil. In an illustrative embodiment, the soil is heated to reduce TOC to less than about 0.15% by weight. In a further embodiment, soil is heated at a temperature and for a duration sufficient to reduce total organic carbon to less than about 0.10% by weight. In yet another embodiment soil is heated at a temperature and for a duration sufficient to reduce total organic carbon to less than about 0.05% by weight. An illustrative range of TOC reduction is to about 0.01% to about 0.15%.

Temperature ranges for remediating PFAS compounds according to illustrative embodiments of the method include, for example, about 225 degrees Celsius to below 440 degrees Celsius; about 300 degrees Celsius to about 400 degrees Celsius; about 320 degrees Celsius to about 380 degrees Celsius, and about 330 degrees Celsius to about 350 degrees Celsius.

Heating duration for remediating PFAS compounds according to illustrative embodiments of the method include about one day to about 30 days, about five days to about 25 days, and about two days to about 10 days.

Heating may be performed by various thermal remediation techniques. In an illustrative embodiment, heating is performed by conductive heat transfer using heater wells installed into the soil. One or more heater wells are installed to create a temperature gradient in the soil to establish conductive heat transfer through the soil from the heater wells. When the temperature of the heater well is higher than the surrounding soil, heat energy will flow to the soil. Details of an illustrative conductive heat transfer method and system are provided below.

It has been accepted in the industry that conventional soil remediation heating techniques could not be applied because of the level of heat necessary to remediate PFAS compounds. Disclosed embodiments of PFAS remediation target the TOC reduction to more readily release the PFAS compounds from carbon compounds, thus facilitating use of various thermal remediation techniques.

Importantly, heat is selectively modulated to balance the energy input to the system with heat losses, such as to the atmosphere. The heat must also be regulated to sufficiently reduce TOC while maintaining temperatures at levels that will not damage the heater wells. The timing and amount of heat transferred to the soil is regulated based on factors such as types and concentrations of PFAS compounds, for example. Accordingly, the temperature may be monitored throughout the soil matrix and also at the heater wells. Adjustments are made to balance the TOC reduction required with the temperature limits of the heater wells Heat sensors provide temperature level information, which can be accessed and monitored manually, or configured to provide input to the heater wells to increase or decrease power to the heater wells to regulate the temperature.

In step 106 evaporated PFAS compounds can be captured once released from the soil pursuant to the application of heat. For example, a vapor recovery system can be used to capture the evaporated PFAS. In step 108 PFAS can be removed from the vapor stream by cooling the vapor stream and condensing the PFAS. In steps 110, 112 steam may be produced in the process or added to the process to allow for capture of the PFAS in a condensed and concentrated aqueous solution where the PFAS are then destroyed in a continuous process using electro-oxidation techniques such as advanced electrochemical oxidation or an electrical discharge plasma reactor as provided in step 114.

The combination of heating duration and temperature level can be adjusted for the particular PFAS being remediated. Embodiments of the remediation method include the various combinations of any of the illustrative temperature ranges and time ranges. For example, the most common PFAS compounds, perfluorooctanoic acid (PFOA) and perfluorooctane sulfonate (PFOS), may be remediated to concentrations of less than 1 microgram per kilogram by applying temperatures in the range of 350 to 400 degrees Celsius to the soil.

The method can be performed in-situ or soil can be removed and treated ex-situ.

In an illustrative thermal conduction heating method, heater wells are installed in in the soil to be remediated, distributed in an array according to factors, such as for example, contaminant concentration and location, soil characteristics and heater well characteristics. Heater wells may be installed at regular intervals, or varying intervals depending, for example, on the necessary energy to be imparted into the soil and the temperatures needed to adequately remediate the contaminants. Heater wells generally comprise heating components or elements disposed within steel pipes. The heat may either move the contaminants in the soil toward the heater wells or destroy the contaminants in-situ. For example, sufficient levels of heat can be produced to boil the water in the soil and vaporize the contaminants. Contaminants that migrate toward the heater wells can be collected and directed through the wells or piping to the surface, where they can be removed or treated. PFAS compounds may be removed from the vapor stream by passing the heated vapors through a condensing system such as a heat exchanger or scrubber where the PFAS compounds are concentrated into an aqueous solution for treatment.

In an illustrative embodiment, a flexible, generally, helical heater is implemented to uniquely achieve PFAS remediation in soils by effectively bringing the soil to the necessary temperature or temperatures. The term "helical" as used to describe the flexible heater shall include coils that are true helixes and those that are not necessarily a true mathematical helix. The flexible helical heater includes an electrical resistance heating wire coiled about a current return wire that fits inside a small diameter metal casing. The electrical resistance heating wire may be comprised, for example, of a nickel-chromium alloy such as NiChrome®, a copper-nickel alloy such as Cuprothal® or an iron-chromium-aluminum ferritic allow such as Kanthal®. Heating soils to temperatures in the range of 225 to 440 degrees Celsius, for example, requires relatively tight spacing for heater wells, which may drive up the price and complexity of remediation. The flexible helical heaters can fit into smaller diameter metal casings than traditional heaters, which may significantly reduce the cost and complexity of the PFAS remediation. In an illustrative embodiment, specific zones along the length of a heater well that contain more PFAS or TO than other zones are targeted with higher temperature by adjusting the coil spacing. C. In a further embodiment, heat loss is compensated for by adjusting coil spacing to put more heat in at the top and bottom of a casing to compensate for heat loss.

Details of an illustrative flexible helical heater that may be used for PFAS remediation is now described. Embodiments of the flexible helical heater include an electrical resistance heating wire coiled about a current return wire that may be shipped and installed more easily than conventional heaters, and may provide adjustability of heating at different levels. Embodiments of the flexible helical heater can be compressed like a spring to create a more compact product for shipping or otherwise transporting. The flexible helical heater may fit inside a subsurface metal casing of much smaller diameter than is typically used in the industry when employing stiff heaters. Special equipment needed to install stiff, tubular heaters, such as cranes or other lift equipment, may not be needed with embodiments of the flexible helical heater. In a particular embodiment, the flexible helical heater can fit inside a pipe as small as 25 millimeters to 50 millimeters in diameter. Coil density or helix pitch can be modified to regulate heating for different depths. As used herein, "coil density" is the number of coils per length unit and is the inverse of helix pitch. Changes in heating may be more easily implemented in the field after a project has started than with stiff, tubular heaters. In an exemplary embodiment the flexible helical heater is more light-weight than conventional stiff heaters, which may make it easier and safer to install. A generally circular type coil will typically be easiest to create and empty but other shape coiling can achieve similar effects and devices.

Figure 2:
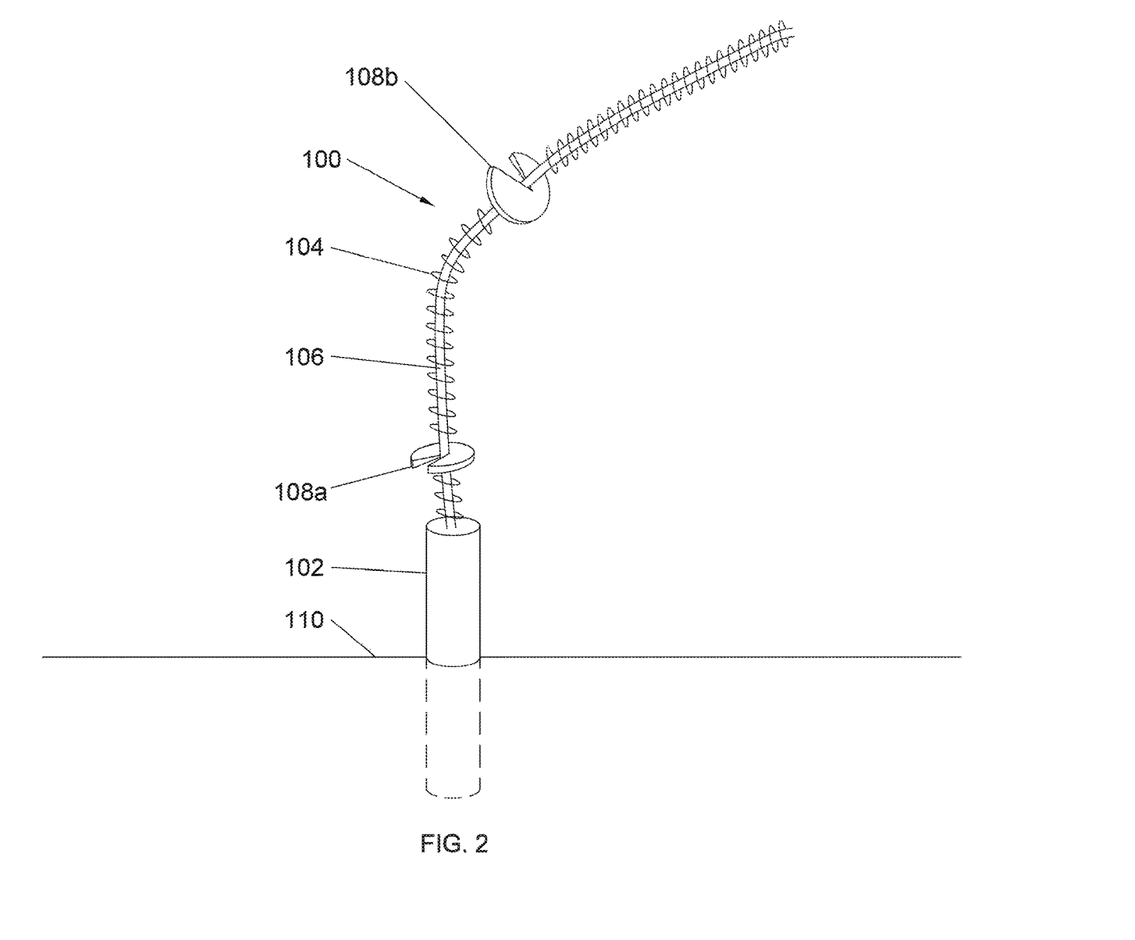
FIG. 2 depicts an embodiment of a flexible heater being inserted into a heater well casing.

FIG. 2 depicts an embodiment of a flexible helical heater 100 being inserted into a heater well casing 102, which typically comprises metal. Flexible helical heater 100 has a helical heating wire 104, which may be for example, a NiChrome wire, or other suitable electric resistance heating wire. In an exemplary embodiment, helical heating wire 104 is a flexible, high-temperature wire. Although the invention may be described with regard to NiChrome wires, wires consisting of other suitable alloys or metals may be used. As used herein, "NiChrome" refers to a nickel-chromium alloy.

Nickel-chromium alloys that contain other metals may also be used. Typically, nickel will be the primary metal in the alloy, i.e. making up the largest percent of the metals. The terms "helical" and "helix" are used broadly and include coiling that mathematically is not a helix and also that which is a mathematical helix. In an exemplary embodiment, helical heating wire 104 may have a diameter in the range of 0.025 millimeters to approximately 10 millimeters, which may be, for example, a NiChrome wire gauge in the size range of 000 to 50 American Wire Gauge (AWG). In a further illustrative embodiment, the diameter of helical heating wire 104 is in the range of 1 to 4 millimeters (17 to 6 AWG). Generally, the diameter of helical heating wire 104 is selected for optimum flexibility and coil density.

An illustrative helix internal diameter may range from 5 millimeters to greater than 150 millimeters when used in a large casing. In a further embodiment, helical heating wire 104 will have an internal helix diameter in the range of 6 millimeters to 40 millimeters. Helical heating wire 104 in this range will typically allow for insertion into small casings which may save time and money. Heat from helical heating wire 104 is transferred to heater well casing 102.

A current return wire 106 runs concentrically through the coils of helical heating wire 104 to serve as both a support for the heater and an electrical current return. Although current return wire 106 is described as being concentrically disposed through the coils, it may not be specifically centered within the coils, and its position with respect to the coils may vary throughout its length. Current return wire 106 may be, for example, a flexible, high-temperature rated, ceramic-insulated wire. An illustrative temperature rating of current return wire 106 is at or near 1000° C., and therefore, in which case mica and ceramic-braided insulation on a nickel wire conductor may be suitable. Other examples of materials include mica and fiberglass insulation on nickel-plated copper wire; although this option offers a lower temperature rating. Current return wire 106 may also be constructed as an uninsulated wire that is manually wrapped with a high-temperature insulation. For example, bare nickel-plated wire or stock nickel welding wire may be manually wrapped with a ceramic fiber tape to create a flexible, insulated current return wire. Current return wire 106 may have an outer diameter in the range of typical wire sizes ranging from 50 AWG to 000 AWG (which corresponds to approximately 0.025 millimeters to 10 millimeters in diameter). In a further illustrative embodiment, the diameter of current return wire 106 is in the range of approximately 1 millimeter to 7 millimeters (17 to 1 AWG). Illustratively, the diameter of current return wire 106 provides sufficient structural support and adequate surface area to reduce resistance. In an illustrative embodiment, current return wire 106 occupies helix-internal space defined by coils of helical heating wire 104 in the range of 0.1 to 99%. In an exemplary embodiment, the space occupied by current return wire 106 within the helix-internal space is in the range of 16 to 71%.

Further shown in FIG. 2 is an electrically-insulating centralizers 108a, 108b to position sections of helical heating wire 104, including maintaining selected coil density.

Figure 3:
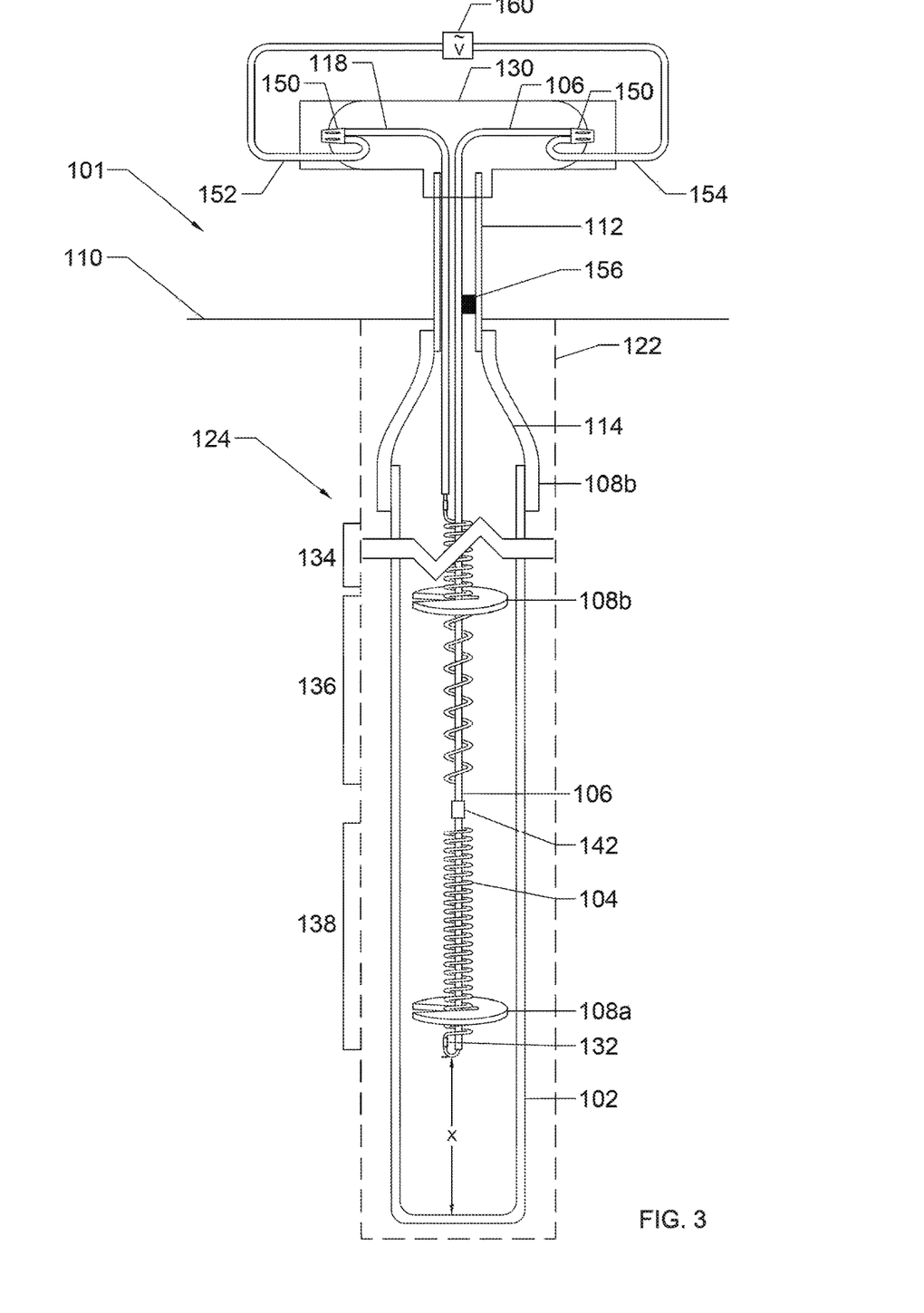
FIG. 3 is a schematic of a heater well used for subsurface heating applications having a resistance heating wire coiled around a current return wire, wherein the coil density can be adjusted to obtain desired heating intensities. The flexible helical heater is shown within a cross-section of other components that together comprise the heater well.

FIG. 3 is a schematic of a heater well 101 used for heating, with applications of soil, groundwater or rock to remove contaminants. In an illustrative embodiment, the submersed portion 124 of heater well 101 is placed within the soil, groundwater or rock (also called the "remediation material") that is targeted for contaminant removal. Submersed portion 124 of heater well 101 may be created by boring or punching a hole 122 into the remediation material and inserting a casing 102. Hole 122 is shown by a broken line and a cross section of casing 102 is depicted. As used herein, "punched" means an installation method in which a hole 122 is formed by compressing or displacing subsurface material. In other subsurface embodiments, hole 122 may not be lined with a casing or may be lined with another material or component. For example, no lining may be required in solid, competent, bedrock. Submersed portion 124 of heater well 101 may also exist in an above-ground heating application. For example, if soil or rock is excavated and staged in a pile or box at the surface, submersed portion 124 of heater well 101 may extend through the remediation material interface 110 in an above-ground treatment application. Accordingly, "submersed portion" is intended to mean the portion of heater well 101 that is within the remediation material or its surrounding material. Remediation material interface 110 is defined as the layer that separates the remediation material to be treated (soil, groundwater or rock) from its surroundings. In an above-ground or subsurface application, casing 102 may extend into the remediation material for a significant distance. In an above-ground application, several hundred feet of casing 102 may be laid out horizontally or otherwise, non-vertically, within the soil, rock or groundwater for heating. In a subsurface application, casing 102 may extend to the maximum achievable depth of drilling equipment, typically in the range of 30 meters to 60 meters for environmental remediation applications.

At the top edge of casing 102 is optional reducer 114. Reducer 114 and a pass-through 112 provide a cross-sectional pipe area less than that of casing 102 to reduce vertical thermal conduction and convection outside the targeted remediation material. Although reducer 114 is illustrated as a bell reducer, an equivalent fitting that effectively reduces the diameter to pass-through 112 may be used, such as a reducing bushing. Reducing the vertical thermal conduction and convection typically reduces heat losses and the temperature of surface components. Insulating material 156 may also be placed within pass-through 112 to further prevent or reduce conductive and convective heat transfer out of casing 102. Insulating material 156 may consist of any high-temperature flexible insulating media such as mineral wool, glass wool or ceramic cloth. Pass-through 112 might be constructed of stainless steel or ceramic to further reduce its thermal conductivity. Pass-through 112 accommodates a current delivery wire 118, and current return wire 106. Illustratively, both current delivery wire 118 and current return wire 106 are insulated wires that have high temperature rating. Pass-through 112 supports electrical connection box or "junction box" 130. Junction box 130 can take many forms, including those known in the art. Because junction box 130 is typically near ambient temperature, it can use standard electrical components. Current delivery wire 118 and current return wire 106 connect to power source wires 152, 154, respectively, within junction box 130. Power source wires 152, 154 provide electrical power from a power source 160, which applies different voltages to wires 152, 154. Power Source wires 152, 154 may be, for example, standard copper wires, and may be connected to current delivery wire 118 and current return wire 106, respectively, by any conventional connection means, for example by wire nuts 150 as illustrated in FIG. 3.

Helical heating wire 104 is disposed within casing 102. Within helical heating wire 104 is current return wire 106. A first centralizer 108a and second centralizer 108b position current return wire 106 and helical heating wire 104. First and second centralizers 108a, 108b may provide electrical insulation of helical heating wire 104 and current return wire 106 from casing 102. For insulation purposes, first and second centralizers 108a, 108b may be made of, for example, ceramic (for example; alumina, mullite or zirconia) or porcelain, or other suitable high temperature insulating material that can withstand the temperatures to which they will be exposed in the system during operation.

In an exemplary embodiment, one or more centralizers are installed onto current return wire 106. In FIG. 3, first and second centralizers 108a, 108b correspond to lower and upper positions, respectively, however, it is noted that submersed portion 124 of heater well 101 need not be vertical. Submersed portion 124 of heater well 101 may be positioned as necessary to reach desired heating locations. This may include positioning submersed portion 124 of heater well 101 to avoid interference with structures in the vicinity. Heater well 101 may be positioned below permanently-located or fixedly-located objects.

Electrical current is delivered by power wire 152 to helical heating wire 104 through current delivery wire 118 that passes through pass-through 112 at or near the top of heater well 101. Pass-through 112 extends into junction box 130. Pass-through 112 may be for example, a stainless steel pipe or other hollow component that reduces thermal conduction and convection. In an exemplary embodiment, pass-through 112 is a 12 to 152 millimeter diameter type 304 stainless steel pipe. The optimum material of pass-through 112, like other components of heater well 101, depends, at least in part, on the environment. For example, in certain conditions, corrosion-resistant metals or alloys may be beneficial. Current delivery wire 118 connects to helical heating wire 104, at the top of the targeted remediation material.

Helical heating wire 104 is connected to an insulated current return wire 106 toward or at the bottom of heater well 101 with a wire connector 132, which may be a high-temperature butt splice or other crimp connector. Other components that connect helical heating wire 104 to insulated current return wire 106 and function to provide the necessary electrical qualities may be used. Helical heating wire 104 extends to varying distances within casing 102, but in an exemplary embodiment does not extend any closer to the bottom of casing 102 than a distance "X" equivalent to approximately 2% of the length of the entire flexible helical heater 100 in order to allow room for thermal expansion. For example, if the flexible helical heater 100 were 10 meters in length, a distance "X" of 0.2 meters (2% of 10 meters) should exist between the bottom of flexible helical heater 100 and the bottom of casing 102.

Helical heating wire 104 may vary in pitch, i.e. density of the coils, throughout its length, and may also have non-coiled sections. FIG. 3 shows a first coiled section 134 extending from current delivery wire 118, and having a relatively high coil density. A second coiled section 136 extends below first coiled section 134, and has a lower coil density. The area surrounding first coiled section 134 will have a higher heat output than the area surrounding second coiled section 136 because of the higher density of coils. A third coiled section 138 is shown extending further into heater well 101, in which the coils have a similar density to that in first coiled section 134. Variation in heat output is desired for many reasons, one of which is to counter heat losses at the top and the bottom of the targeted heated volume, and therefore, achieve a more uniform subsurface temperature at a distance from the heater well. The coils of helical heating wire 104 may be pulled apart or compressed as desired to achieve the most appropriate heating for targeted portions of the remediation material. For example, if a site is impacted from a fuel spill to 10 meters below ground (10 meters below the remediation material interface 110), but most of the fuel is known to exist between the depths of 2 to 5 meters, the coil density of helical heating wire 104 would be compressed across a section of helical heating wire 104 extending from 2 to 5 meters into casing 102, thereby creating a greater heat output per length than a wire section with lower coil density. The coil density may be expanded to provide a lower coil density in other portions of heater well 101. In addition, the distribution of coil density along the length of heater well 101 can be varied during a break in heater operation. Illustrative embodiments of flexible helical heater 100 may allow such variations to be accomplished relatively easily and in a short period of time. In an exemplary method, flexible helical heater 100 can be removed from casing 102, centralizers 108a, 108b can be slipped off current return wire 106, the coil density can be re-distributed and centralizers 108a, 108b returned to the current return wire 106, installed to maintain the adjusted coil density and position. Additionally, or instead, one or more centralizers may be removed. This ease of modification allows the operator to adjust to unexpected subsurface conditions encountered during operation, such as a cool interval caused by inflowing groundwater.

FIG. 3 shows second centralizer 108b disposed between first coiled section 134 and second coiled section 136. First centralizer 108a is placed below third coiled section 138 and above wire connector 132. Wires may be wrapped at centralizer locations, such as shown by tape 142, between second coiled sections 136 and third coiled section 138. A centralizer may be placed over tape 142. Tape 142 may be ceramic tape, for example.

Figure 4:
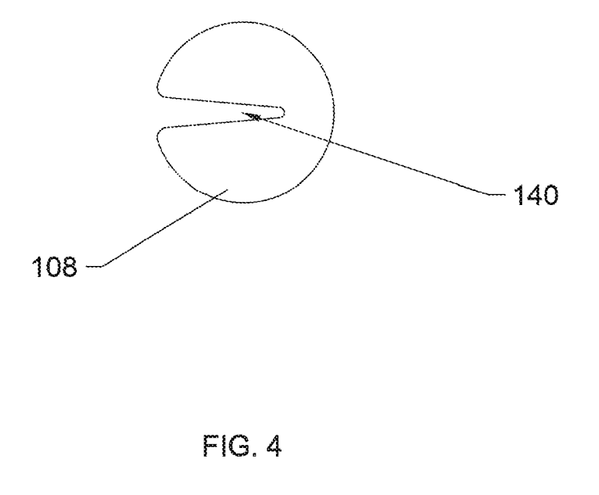
FIG. 4 depicts a centralizer in the form of a notched centralizer.

FIG. 4 depicts a centralizer 108 in the form of a notched disk. Although shown as a circular disk, the shape of centralizer 108 is not critical and it may take on other shapes such as a triangle, square, polygon or irregular shape while still maintaining its purpose and function. Notch 140 is provided so centralizer 108 can be pushed laterally onto current return wire 106 to provide an interference fit or friction fit. The notch may be any shape that can provide the proper fit so it can be inserted and remains in place. Other mechanisms may be used to secure centralizer 108 onto return wire 106, provided they adequately position the centralizers, maintain the desired coil density, and withstand the environment and heating process. The term "laterally" is used broadly herein and does not imply a precise direction. Centralizer 108 may be placed on helical heating wire 104 either between coils or between a coiled and straight section. Tape 142 may provide extra wire protection at the centralizer location and increase the friction fit. Centralizer 108 may prevent helical heating wire 104 from contacting casing 102 when placed into heater well 101. Centralizer 108 also may secure loops of helical heating wire 104 to current return wire 106 at selected depths into casing 102 to alter the amount of heat intensity as desired. The notched configuration of Centralizer 108 allows coil-density to be changed during a heating project for soil, groundwater or rock.

Returning to FIG. 3, first and second centralizers 108a, 108b are secured to current return wire 106 sufficiently to maintain coiled sections 134, 136, 138 at the desired depths and with the selected coil density. Although three helically coiled sections are shown for illustration purposes in FIG. 3, the design may include more or less helically coiled sections depending on how many different levels of heating are desired.

In the configuration shown in FIG. 3, first and second centralizers 108a, 108b have a larger diameter than the narrowest part of reducer 114. Therefore, installation includes boring a hole into the ground, roughly of uniform diameter, inserting helical heating wire 104 and current return wire 106, expanding and compressing helical heating wire 104 as desired and placing first and second centralizers 108a, 108b as needed to maintain the desired coil compression or pitch. Reducer 114 may then be put in place to reduce the diameter of the opening at the top of casing 102.

FIG. 3 shows two centralizers 108a, 108b. Depending on the distribution of coil densities needed to obtain the desired heating distribution or amount, one or more centralizer may be needed, or if a uniform coil density is chosen, then no centralizers need to be used, unless required for electrical isolation purposes or other benefits. Centralizers 108a, 108b prevent uninsulated helical heating wire 104 from contacting steel casing 102 and causing an electrical short circuit, which may occur for example, in situations where the diameter of casing 102 is small or the casing is not installed perfectly vertical. If the casing is not vertical, then generally more centralizers are required.

In an illustrative embodiment, power is fed to helical heating wire 104 using high-temperature insulated wires of different voltage potential attached to both ends of helical heating wire 104. Helical heating wire 104 attaches to current delivery wire 118 at a first end of helical heating wire 104, and to current return wire 106 at a second, opposite end. In an exemplary embodiment, helical heating wire 104 is NiChrome and current return wire 106 and current delivery wire 118 are 100% nickel and the insulation surrounding the nickel wire is a ceramic-fiber braid. Note that although current return wire 104 and current delivery wire 118 as described indicate operation of the flexible helical heater 100 in a direct current (DC) mode, electrical current to the helical heating wire 104 may be delivered as either DC or alternating current (AC).

Embodiments of helical heating wire 104 may provide greater flexibility in the design of heater well 101. The following factors, among possible others, may be independently varied to adjust the configuration and performance of heater well 101:

1. applied voltage across the flexible helical heater
2. heat intensity
3. wire diameter
4. helix diameter
5. helix pitch/coil density.

For a given heat intensity, factors that increase the surface area of helical heating wire 104, such as larger coil diameter or smaller pitch, result in a lower coiled heating wire temperature. The gauge of helical heating wire 104 can be decreased, i.e. diameter increased, if it is desired to make helical heating wire 104 stiffer and more durable. The variability of the factors, may allow heater well 101 to be tailored to a wide range of situations and applications.

In an illustrative embodiment, the applied voltage across helical heating wire 104 is in the range of 5 volts per foot to 15 volts per foot of heated depth or heater well length. The heat intensity is illustratively 200-500 W/ft. Illustrative helical heating wire 104 specifications include, a wire diameter of 6-18 gauge; a helix diameter in the range of 12 millimeters to 25 millimeters; and a pitch of 5 millimeters to 50 millimeters. The illustrative pitch range may be varied along a single section coiled section of helical heating wire 104 or between different coiled sections.

The insulated current return wire 106 is critical to flexible helical heater 100 in that it provides the support to suspend, and the power to operate, helical heating wire 104. Examples of current return wire 106 materials that may be suitable for various temperatures follow. In an application where only moderately high temperatures of less than 200° C. are anticipated within the heater well, current return wire 106 may be constructed of copper wire with a fluorinated polymer insulation, such as Teflon. Where temperatures in the range of 200° C. to 400° C. may be anticipated, current return wire 106 may be constructed of nickel-coated copper wrapped in a glass-fiber, mica-fiber or ceramic-fiber insulation. At temperatures above 400° C., current return wire 106 may be constructed of nickel wire with a ceramic-fiber insulation. Such wires may not be available in the marketplace, but may be constructed as needed by wrapping a nickel wire with ceramic fiber tape. The coiled design of helical heating wire 104 allows for expansion inside casing 102 while preventing incidental contact of helical heating wire 104 with the walls of casing 102 because the expansion is taken up in the coils. The coil density (number of heating wire coils per specific length of heater or "helix pitch") can be changed to apply different heating intensities at different depth intervals of heater well 101. Centralizers 108a, 108b can be removed to adjust coil density at nearly any time during use, including prior to or in the middle of a heating project, such as for example, soil, groundwater or rock, if needed.

Flexible helical heater 100 may be employed to remediate contaminants using various methods. In an illustrative embodiment, a hole is bored into the ground, for example by a drill rig. A casing that can accommodate flexible helical heater 100 is installed into the hole. Flexible helical heater 100 transfers heat to the contaminated surroundings. The heat may volatilize contaminants in the soil by increasing the vapor pressure of the contaminants. In other applications, the heat may increase the temperature of groundwater to enhance aqueous-based chemical reactions which destroy the contaminants in place. For compounds that have low volatility, high temperatures may be applied by the heater well to chemically break down the molecular structure of the contaminants. Typically, a series of heater wells will be installed in a contaminated area.

Compared to conventional, bulky, stiff, tubular heaters, illustrative embodiments of flexible helical heater 100 may be easily installed, for example by hand and by only one person, even if flexible helical heater 100 is of substantial length.

PFAS remediation may be affected by site characteristics, types of PFAS compounds being remediated due to varying chemical and physical characteristics, source of the PFAS, whether there are multiple types of PFAS compounds, nature of the release pathways, the make-up of other contaminants and materials in the soil. The disclosed remediation technique can take into consideration these variables and the number of carbon bonds and the alkyl functional group of the PFAS being remediated. In general, the larger the molecule, the higher the boiling point, but this general relationship can vary. The disclosed methods may include combinations of the remediation techniques.

Various embodiments of the invention have been described, each having a different combination of elements. The invention is not limited to the specific embodiments disclosed, and may include different combinations of the elements disclosed, omission of some elements or the replacement of elements by the equivalents of such structures.

Terms such as "about," "approximately," when modifying quantities include typical measurement error or amounts that satisfy the purpose of the quantity. The specific amounts without the modifiers are also included as disclosed parameters.

While illustrative embodiments have been described, additional advantages and modifications will occur to those skilled in the art. Therefore, the invention in its broader aspects is not limited to specific details shown and described herein. Accordingly, it is intended that the invention not be limited to the specific illustrative embodiments, but be interpreted within the full spirit and scope of the appended claims and their equivalents.

The invention claimed is:

1. A method of remediation of soil containing PFAS compounds and organic carbon, the method comprising:
reducing the total organic carbon by heating the soil at a sufficient temperature and for a sufficient duration to reduce surface effects between the PFAS compounds and the TOCs to a sufficient level to permit evaporation of the PFAS from the soil.

2. The method of claim 1 comprising heating the soil at a temperature and for a duration sufficient to reduce total organic carbon to less than 0.15% by weight.

3. The method of claim 1 comprising heating the soil at a temperature and for a duration sufficient to reduce total organic carbon to less than 0.1% by weight.

4. The method of claim 1 comprising heating the soil at a temperature and for a duration sufficient to reduce total organic carbon to less than 0.05% by weight.

5. The method of claim 1 wherein the soil is heated to a temperature in the range of 225 degrees Celsius to 440 degrees Celsius.

6. The method of claim 1 wherein the soil is heated to a temperature in the range of 300 degrees Celsius to 400 degrees Celsius.

7. The method of claim 1 wherein the soil is heated to a temperature in the range of 320 degrees Celsius to 380 degrees Celsius.

8. The method of claim 1 wherein the soil is heated to a temperature in the range of 330 degrees Celsius to 350 degrees Celsius.

9. The method of claim 1 wherein the soil is heated for a duration in the range of 1 to 30 days.

10. The method of claim 1 wherein the soil is heated for a duration in the range of 5 to 25 days.

11. The method of claim 1 wherein the soil is heated for a duration in the range of 2 to 10 days.

12. The method of claim 1 wherein heating is performed by conductive heat transfer using heater wells installed into the soil.

13. The method of claim 1 further comprising capturing the evaporated PFAS by vapor recovery.

14. The method of claim 13 further comprising adding steam to the evaporated PFAS.

15. The method of claim 13 wherein the evaporated PFAS is in a vapor stream, the method further comprising removing PFAS from the vapor stream by cooling the vapor stream and condensing the PFAS.

16. The method of claim 14 further comprising condensing the PFAS and steam to produce a concentrated aqueous PFAS solution.

17. The method of claim 16 further comprising treating the concentrated aqueous PFAS solution by electro oxidation.

18. The method of claim 15 further comprising removing the PFAS from the vapor stream by passing the heated vapors through a scrubber to produce a concentrated aqueous PFAS solution for treatment.

19. The method of claim 1 comprising performing the method in-situ.

20. The method of claim 1 comprising performing the method ex-situ.

21. The method of claim 1 further comprising heating the soil to a plurality of sufficient temperatures along the length of a heater well using a flexible helical heater.

22. The method of claim 21 comprising heating the soil at the top and/or bottom of the heater well to a greater temperature thereby compensating for heat loss.

* * * * *